March 15, 1932.  L. E. WILLIAMS  1,849,260
VEHICLE DRAWBAR
Filed Dec. 29, 1928  2 Sheets-Sheet 1
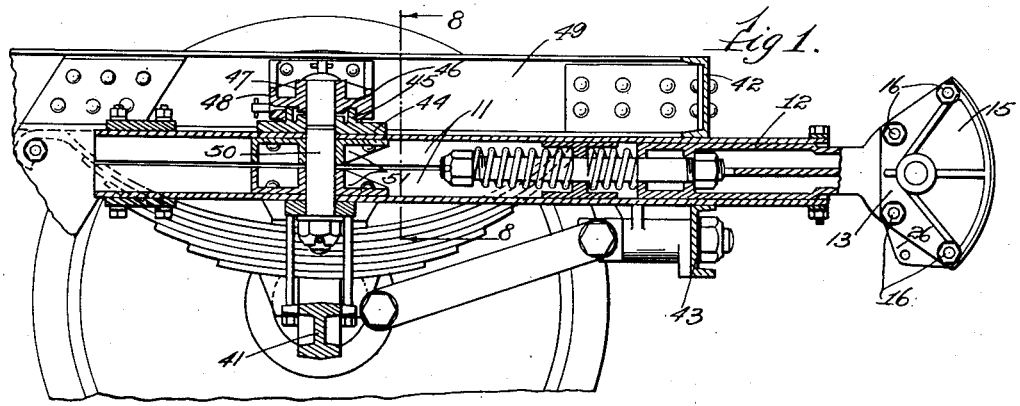
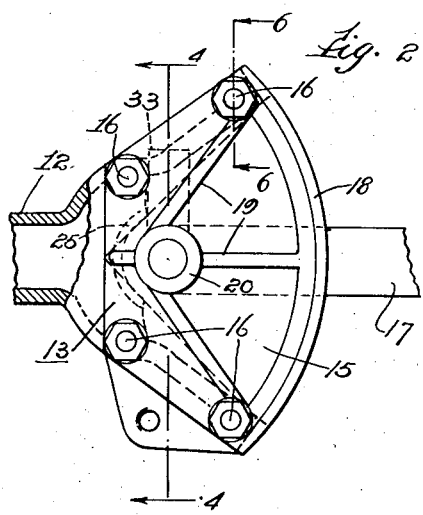
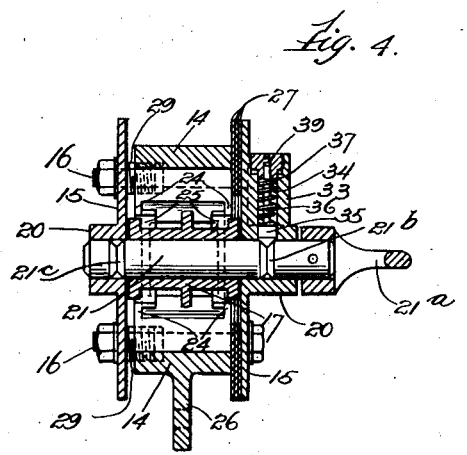
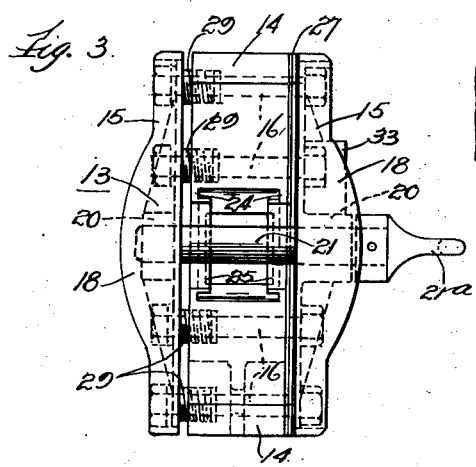
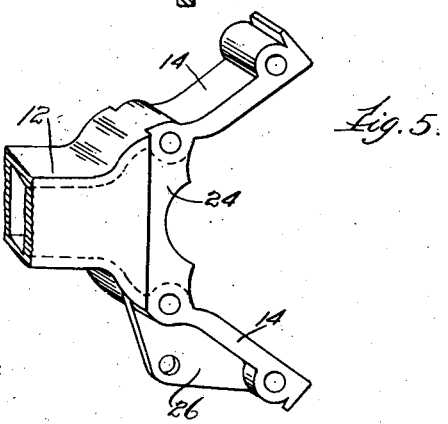
Inventor.
Leroy E. Williams.
by his Attorneys.

March 15, 1932.  L. E. WILLIAMS  1,849,260
VEHICLE DRAWBAR
Filed Dec. 29, 1928  2 Sheets-Sheet 2
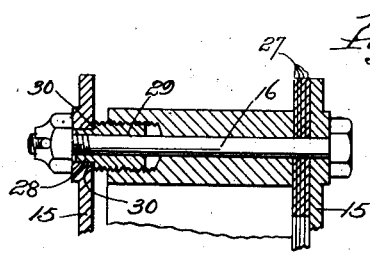
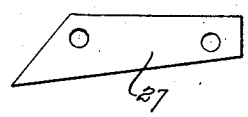
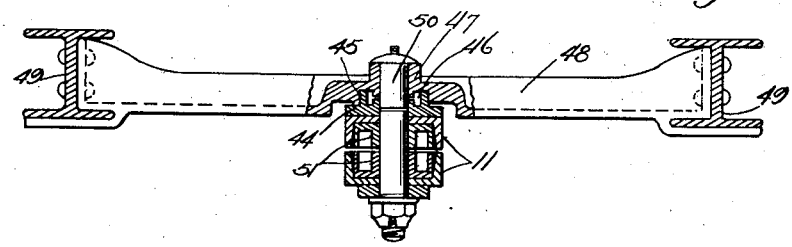
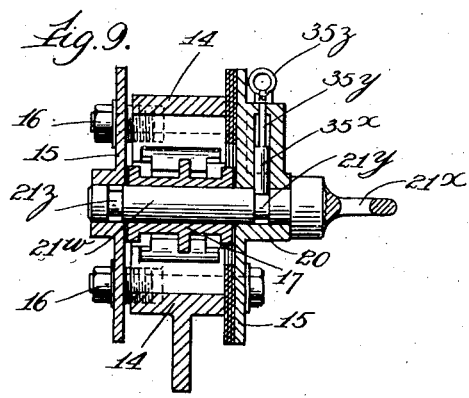
Inventor
Leroy E. Williams
by his Attorneys Patented Mar. 15, 1932

1,849,260

UNITED STATES PATENT OFFICE

LEROY E. WILLIAMS, OF EDGERTON, WISCONSIN, ASSIGNOR TO HIGHWAY TRAILER COMPANY, OF EDGERTON, WISCONSIN, A CORPORATION OF WISCONSIN

VEHICLE DRAWBAR

Application filed December 29, 1928. Serial No. 329,164.

This invention relates to certain improvements in draw bar construction for vehicles of the trailer type, and is particularly concerned with the provision of an improved coupler for connecting the draw bar of the trailer to a draft vehicle, such as a motor truck, tractor, etc. An object of the invention is to provide a coupler with detachably removable side plates or cheeks to permit replacement when the same become damaged or worn. Another object is to provide means for adjusting the side plates with respect to each other to take up excessive side play, such as may result by wear or bending of the coupling plates, to insure proper fit of the coupling bar of the draft vehicle, thus obviating weaving of the vehicles with respect to each other (when connected in a train) caused by a loose fit of these members. A further object is to provide an automatic detent for locking the coupling in or out of operative position. A still further object is to provide an improved king pin mounting for the draw bar. The invention consists in certain features and elements of construction herein shown and described, as indicated by the claims.

In the drawings:

Figure 1 is a fragmentary sectional view of one end of a vehicle embodying this invention.

Figure 2 is an enlarged side view of the coupler proper, shown connected to a coupling bar of a draft vehicle.

Figure 3 is a view looking into the coupler.

Figure 4 is a transverse section taken as indicated at the line 4—4 on Figure 2.

Figure 5 is a fragmentary perspective view of the center member of the coupler.

Figure 6 is an enlarged fragmentary transverse section taken substantially as indicated at the line 6—6 on Figure 2.

Figure 7 is a detail view of a shim plate.

Figure 8 is a fragmentary transverse section taken at the line 8—8 on Figure 1, certain parts being broken away to show details of construction.

Figure 9 is a view similar to Figure 4, showing a modified form of detent.

As illustrated in the drawings, the draw bar is composed of two channel members, 11, 11, secured together in spaced relation with their flanges extending toward each other forming a hollow housing in the forward end of which is slidably mounted the supporting shank, 12, of the coupler head, indicated generally at 13. The shank is connected in the housing to shock-absorbing means of a usual construction for cushioning the impact in transmitting the push or pull from the coupler to the draw bar. The coupler head consists of a center member, integral with the shank, 12, having two oppositely diverging portions, 14, forming upper and lower walls of the coupler, and a pair of transversely spaced, adjustably removable side walls or cheeks, 15, secured to said central member by four suitably spaced tie bolts, 16, extending through the walls, 14. The side walls are spaced to accommodate the coupling link or draft member, 17, of a draft vehicle such as a motor truck, tractor, etc., the link being limited in vertical play by the diverging walls, 14. The forward edge of the side walls is curved, and is reinforced by a laterally extending flange, 18, and further stiffening or reinforcement is provided by ribs, 19, which merge into annular bosses, 20, which are apertured to provide journal support for a transversely extending coupling pin, 21.

The diverging walls, 14, of the center member are connected at each side by webs, 24, which are integrally formed with inwardly extending arcuate flanges, 25, preferably concentric with the apertures of the bosses. These flanges assist in guiding the end of the coupling link in proper position for registration of its eye with the apertures of the side walls for engagement by the coupling pin. The lower wall, 14, of the center member is provided with a centrally located depending lug, 26, for supporting the usual safety chains (not shown).

In Figures 4 and 6, it will be seen that either or both of the side walls may be adjusted for varying the distance between them. The adjustment for one of the side walls is accomplished by the removal of one or more of a plurality of shims, 27, interposed between the side wall and the diverging walls of the center member. These shims of course may be made of various thicknesses to permit of minute adjustment. However, close adjustment of the side walls may also be obtained at the other side wall, which is mounted on the reduced ends, 28, of screw plugs, 29, adjustably threaded into the adjacent edge of the upper and lower walls, 14, and through which plugs the tie bolts, 16, extend. The reduced end of the plugs form outwardly facing shoulders, 30, against which the side wall abuts to maintain the same at proper adjusted position with respect to the center member. Thus, to adjust this side wall with respect to the other merely requires threading the plugs, 29, inwardly or outwardly, to suit the condition. It will of course be understood that the coupler head may be constructed to provide adjustment of both the side walls by either shims, or by the threaded screw plugs.

In the course of use, the side walls of a coupler are frequently bent outwardly, thus resulting in undesired lateral play of the coupling link which imposes undue strain on both the trailer and draft vehicles because of the weaving or snaking action that is set up in the trailer vehicle. This excess play may at least be partially remedied by adjusting the side walls accordingly. Of course, if the side walls are bent to cause an aggravated condition which cannot be alleviated by adjustment of the side walls, then either or both side walls may be replaced. Inasmuch as it is preferable to have minimum play between the coupling link and side walls, there will be a certain amount of wear of these parts, which may after a time also cause weaving of the vehicles, and accordingly this excess play may be taken up by the adjustment of the side walls. Due to the side walls being separable, independent members, their inner faces may be machined to reduce the friction and wear incident to contact with the coupling link. For purposes of illustration, and as shown in the drawings, it may be understood that the shims are of a thickness to permit rough adjustment of the side walls, the screw plugs of the other wall affording fine or minute adjustment, thus insuring a proper fit of the coupling link or draft member. This construction prolongs the life of a coupler, and effects economy in that the entire coupler need not be discarded when the side walls become defective by injury or wear.

To permit manipulation of the coupling pin, 21, to engage or release the draft member, a handle, 21$^a$, is formed at one end. The side wall, 15, adjacent the handle end of the pin is provided with an automatic detent housed in an upwardly extending boss, 33, having an aperture, 34, in line with the vertical axis of the coupling pin. Said detent comprises a plunger, 35, and a stem, 36, on which is mounted a spring, 37, for yieldingly forcing said plunger in a downward direction. A screw plug, 39, is threaded in the upper end of the boss, 33, for adjusting the spring to proper tension, and also serving to complete the enclosure of the detent. The lower end of the plunger is cone-shaped and is adapted to co-operate with a V-shaped groove 21$^b$, formed in the periphery of the coupling pin for locking the same in coupling position. Thus, by axially moving the coupling pin through the bosses of the side walls, the plunger is automatically moved into or out of co-operative engagement with the groove. A second V-groove, 21$^c$, is provided in the end of the coupling pin opposite the handle end, so that when the pin is axially moved to free the draft member, 17, the plunger will yieldingly engage in this groove, 21$^c$, for movably securing the pin in the coupler head, in inoperative position; thus insuring against misplacement of the pin.

Figure 9 illustrates a modified detent of the gravity type, in which a gravity operated plunger, 35$^x$ is formed at its lower end for straddling either of the grooved portions, 21$^y$ or 21$^z$, of the coupling pin, 21$^w$. The outer end of the coupling pin is provided with a handle, 21$^x$, for axially shifting said pin with one of its grooves in registration with the plunger, for releasing or securing the draft member, 17, in the coupling. The plunger has a stem, 35$^y$, extending upwardly through the top of the boss, 33, and provided with a finger grip, 35$^z$, by means of which it may be raised out of engagement with the coupling pin; after the pin has been shifted the plunger is allowed to fall by gravity, so that when either groove is aligned therewith it will automatically drop in place and maintain said coupling pin against axial movement.

In vehicle construction of the character illustrated in the drawings, the draw bar is pivoted adjacent its rear end, and is arranged to control the steering of the vehicle through the usual type of steering linkage (not shown). Although not essential, it is preferable to locate the draw bar pivot centrally above the axle, 41; the forward end of the draw bar being guided and supported between the front tie member, 42, of the frame, and the front cross member, 43. The king pin comprises a lower cast member, 44, secured to the top of the draw bar, having an upwardly extending annular flange, 45, adapted to be interfitted in telescopic relation with a downwardly open annular chamber, 46, formed in the upper king pin member, 47, which is integral with a cross brace, 48, the ends of which are arranged for securement to the beam side members, 49, of the vehicle frame. The king pin members are held against vertical separation by a concentrically disposed bolt, 50, extending downwardly through the draw bar. Filler blocks, 51, are mounted on the inner sides of the draw bar channel members to provide reinforcement and also to journal the bolt, 50. Thus, the lateral thrust due to push or pull on the draw bar is transmitted to the interfitting king pin members, and is distributed over a relatively large bearing area, relieving the bolt, 50, of all strain except against vertical separation of the parts. This construction also tends to stabilize the vehicle in its steering movement.

I claim:—

1. The combination of a draft member, and a coupling head comprising a central supporting member and a pair of spaced side walls, one of said walls being removably secured to said support, removable shims associated with the removable side wall for varying the distance between said walls, together with means for securing the draft member in the head in coupled relation between said side walls.

2. The combination of a draft member and a coupling head comprising a central supporting member and a pair of transversely spaced walls, one of which is removably secured to the supporting member, means for varying the distance between the walls including one or more plugs associated with the removable wall, adjustably threaded in said central member, together with means for securing the draft member in coupled relation in the head between said side walls.

3. In the combination defined in claim 2, said plugs each having a reduced end forming an outwardly facing shoulder adapted to abut against the inner surface of the side wall.

4. The combination of a draft member and a coupling head comprising a central supporting member and a pair of spaced side walls removably secured to said supporting member, means for varying the distance between said walls including removable shims interposed between one of said walls and the supporting member and one or more plugs associated with the other wall adjustably threaded in said supporting member, together with means for securing the draft member in the head between said side walls.

5. In combination with a vehicle frame, a cross brace disposed inwardly from the end of the frame, a draw bar pivotally connected to said brace, said connection consisting of means for preventing vertical separation of said draw bar and brace and co-operating interfitting members carried rigidly by said brace and draw bar respectively adapted to take the thrust of the drawbar in pulling the vehicle independently of the aforesaid means and for providing guidance in steering movement.

6. In combination with a vehicle frame, a cross brace disposed inwardly a distance from the end of said frame, a draw bar supported by the frame and connected to the brace, interfitting members carried by the brace and draw bar, one of said members including an annular flange adapted to be telescoped in an annular chamber formed in the other member to provide lateral guidance during steering movement, and a bolt extending through the interfitting members and the draw bar to prevent vertical separation of the parts.

7. The combination of a draft member and a coupling head comprising a central supporting member and a pair of transversely spaced walls with means adjustably securing one of said walls to the central member and adapted for rigidly holding said wall at any position in its range of adjustment for accurately varying the distance between said spaced walls, and means for securing the draft member in coupled relation in the head between said walls.

LEROY E. WILLIAMS.